(12) United States Patent
Wimmer

(10) Patent No.: US 8,585,069 B2
(45) Date of Patent: Nov. 19, 2013

(54) TELESCOPIC SUSPENSION FORK LEG AND TELESCOPIC SUSPENSION FORK PROVIDED THEREWITH

(75) Inventor: Johannes Wimmer, Kasti (DE)

(73) Assignee: WP Performance Systems GmbH, Munderfing (AU)

( * ) Notice: Subject to any disclaimer, the term of this patent is extended or adjusted under 35 U.S.C. 154(b) by 49 days.

(21) Appl. No.: 13/355,176

(22) Filed: Jan. 20, 2012

(65) Prior Publication Data

US 2012/0187651 A1 Jul. 26, 2012

(30) Foreign Application Priority Data

Jan. 21, 2011 (DE) .......................... 10 2011 000 279
Jan. 21, 2011 (DE) .......................... 10 2011 000 280

(51) Int. Cl.
*B62K 21/02* (2006.01)
*F16F 9/00* (2006.01)

(52) U.S. Cl.
USPC ............ 280/276; 280/279; 188/275; 188/297

(58) Field of Classification Search
USPC .......... 280/276, 279, 284, 285, 288; 188/275, 188/297
See application file for complete search history.

(56) References Cited

U.S. PATENT DOCUMENTS

| 3,912,054 | A | * | 10/1975 | Fabre et al. ................ | 188/282.1 |
| 4,795,009 | A | * | 1/1989 | Tanahashi et al. ............ | 188/315 |
| 4,807,860 | A | * | 2/1989 | Simons ......................... | 267/217 |
| 6,042,091 | A | * | 3/2000 | Marzocchi et al. ........ | 267/64.15 |
| 6,234,505 | B1 | | 5/2001 | Ito | |
| 6,739,609 | B2 | * | 5/2004 | Miyabe ......................... | 280/276 |
| 7,357,232 | B2 | * | 4/2008 | Fujita ............................ | 188/297 |
| 7,793,766 | B2 | * | 9/2010 | Furuya .......................... | 188/297 |
| 2006/0137947 | A1 | | 6/2006 | Fujita | |
| 2006/0225978 | A1 | | 10/2006 | Yun | |
| 2007/0056817 | A1 | | 3/2007 | Ward | |
| 2008/0105505 | A1 | | 5/2008 | Furuya | |
| 2008/0230335 | A1 | | 9/2008 | Furuya et al. | |
| 2010/0207350 | A1 | | 8/2010 | Uchiyama et al. | |
| 2010/0263971 | A1 | | 10/2010 | Lee et al. | |

FOREIGN PATENT DOCUMENTS

| DE | 940 033 | 3/1956 |
| DE | 1 146 312 | 3/1963 |
| DE | 27 42 700 A1 | 3/1978 |
| DE | 102 58 815 A1 | 7/2004 |
| DE | 10 2007 028 634 A1 | 1/2009 |
| EP | 1 666 348 A2 | 6/2006 |
| EP | 1 886 912 A1 | 2/2008 |

(Continued)

*Primary Examiner* — Kevin Hurley
*Assistant Examiner* — Marc A Scharich
(74) *Attorney, Agent, or Firm* — Rod D. Baker

(57) ABSTRACT

A telescopic suspension fork leg, such as may be used in a motorcycle. The fork leg has an inner tube and an outer tube and a damping arrangement and a spring arrangement, which is arranged within a first chamber which is formed in the outer tube and is supported against a second chamber formed by the damping arrangement and arranged beneath the first chamber, which is constructed to receive a damping fluid. The damping arrangement has a piston, on a piston rod, with upper and lower piston surfaces. The piston is displaceable within a damping tube arranged largely concentrically to the inner tube, and the damping tube is surrounded by an annulus chamber arranged largely concentrically to the damping tube, and a sealing arrangement, displaceable along the piston rod, is provided between the first and second chambers.

10 Claims, 6 Drawing Sheets

(56) References Cited

FOREIGN PATENT DOCUMENTS

| | | |
|---|---|---|
| EP | 2 017 495 A1 | 1/2009 |
| JP | 05-263826 A | 10/1993 |
| JP | H06-4442 U | 1/1994 |
| JP | 2000-320598 | 11/2000 |
| JP | 2004-019693 A | 1/2004 |
| JP | 2008-057637 A | 3/2008 |
| JP | 2010-127327 A | 6/2010 |
| JP | 2010-168002 A | 8/2010 |
| WO | WO 2007/046750 A1 | 4/2007 |
| WO | WO 2008/085097 A1 | 7/2008 |

* cited by examiner

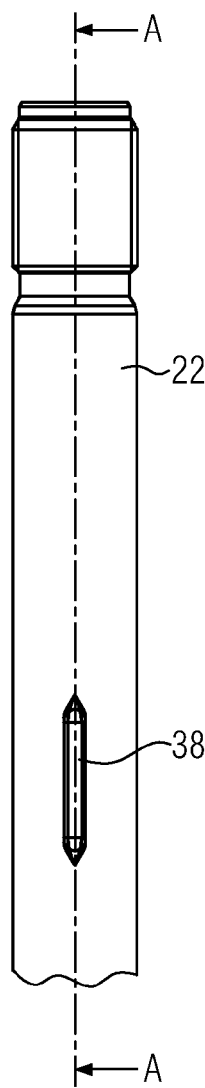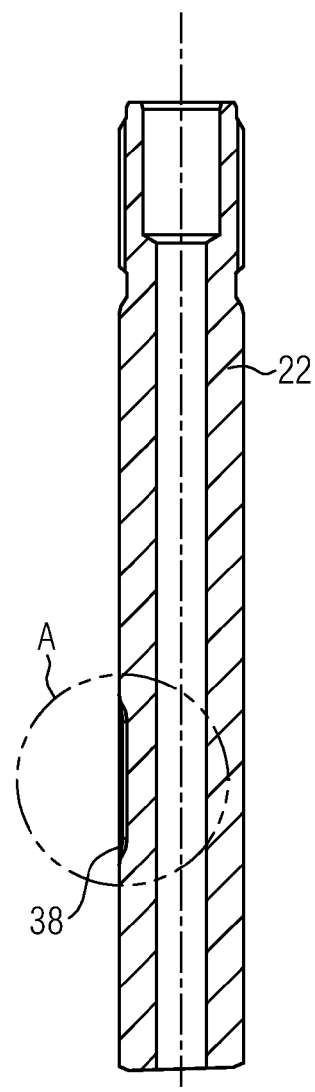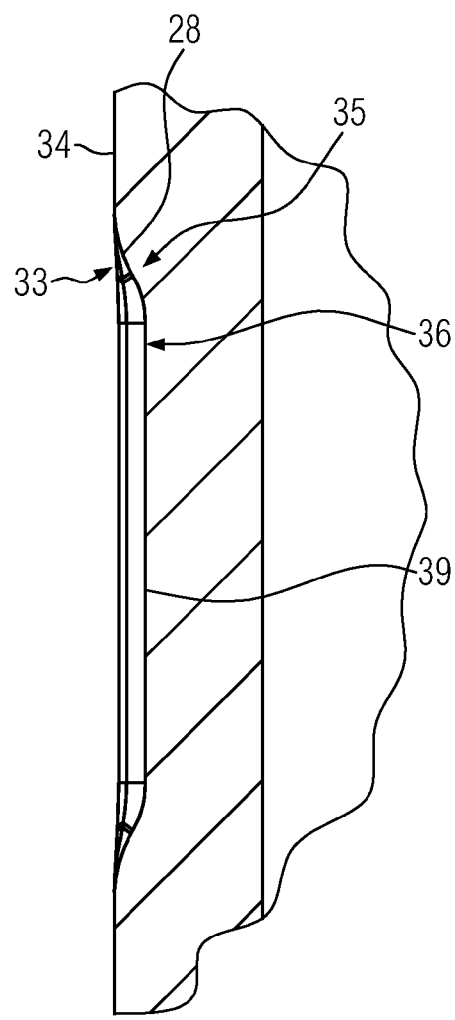
Schnitt A-A
FIG. 5    FIG. 6    Detail A
              FIG. 7

TELESCOPIC SUSPENSION FORK LEG AND TELESCOPIC SUSPENSION FORK PROVIDED THEREWITH

CROSS-REFERENCE TO RELATED APPLICATIONS

This application claims priority to German Patent Application No. DE 10 2011 000 279.0, filed on 21 Jan. 2011, the entirety of which is incorporated herein by reference. This application also claims priority to German Patent Application No. DE 10 2011 000 280.4, also filed on 21 Jan. 2011, and the entirety thereof likewise is incorporated herein by reference.

BACKGROUND OF THE INVENTION

1. Field of the Invention

The present invention relates to a telescopic suspension fork leg with an inner tube and an outer tube and a damping arrangement and a spring arrangement.

2. Background Art

The telescopic suspension fork leg according to this disclosure can be used, for example, for the formation of a telescopic suspension fork, also abbreviated to "telefork," which is used on a motorcycle or, for example, on a bicycle. Such a telescopic fork fulfils the function of guiding a front wheel of the vehicle in question, undertakes the task of suspension, and serves for damping when the vehicle moves over uneven areas of the roadway. The telefork provides that the spring movement subsides rapidly again, and also serves to support a braking moment which is built up upon a braking of the front wheel as a reaction moment, relative to the frame of the vehicle.

Owing to the high force demands which are placed on a telescopic fork, a telescopic suspension fork leg which is used for the formation of the telescopic fork possesses a plurality of functionalities and components by which, for example, the spring characteristic and the damping characteristic of the telescopic suspension fork leg can be influenced.

To bring about a damping function for the damping of the oscillating movement of the inner tube and of the outer tube relative to each other, known damping arrangements have bores, through which a damping fluid (for example, a telescopic fork oil) can flow. To achieve a required characteristic in response to the respective specification of the rider or respectively as a reaction to the condition of the roadway surface, the damping arrangement possesses generally adjustable valve arrangements, by which the through-flow behavior of the damping fluid can be adjusted.

When the damping fluid flows through the bores or valves, respectively, very high pressures are formed locally, which are so great that air bubbles develop. This potentially can cause cavitation in some known damping arrangements. In order to prevent cavitation, the damping fluid is placed under high pressure, so that the formation of gas bubbles cannot occur in the first place.

A front wheel fork for a two-wheeled vehicle has become known by means of publication WO 2008/085097 A1. In this known front wheel fork, a telescopic suspension fork leg is provided, which has an inner tube and an outer tube and a damping arrangement and also a spring. The spring is arranged here in a first volume O1, whilst the damping arrangement has a second volume O2, which are sealed hermetically with respect to each other. The damping arrangement of this known type of front wheel fork has two fluid volumes separated from each other, which can be optionally connected with an equalizing reservoir. In this known front wheel fork, the fluid in the first chamber, which holds the spring arrangement, can disadvantageously mix with the fluid in the damping arrangement. For this reason, a third volume is provided, which is preferably filled with air and is intended to prevent a direct contact between the first volume O1 and the second volume O2.

By means of Japanese publication JP 05263826 A, a gas spring has become known, which has a seal which has a greater diameter than a piston rod on which the seal is arranged, supposedly to reduce the friction resistance of the piston rod.

From publication WO 2007/046750 A1 a front wheel fork is known which has a damping arrangement according to the so-called "closed cartridge" principle. This known front wheel fork here has a main spring arranged in the inner tube which is penetrated by a piston rod. On the piston rod, a damper piston is arranged which can carry out a back-and-forth movement in an inner tube of the damper arrangement. In doing so, it displaces a damping fluid present in the damping arrangement out from the interior of the inner tube via apertures which are connected with an annular space arranged coaxially to the interior of the damping tube. The annular space is in turn in fluid communication with a return flow chamber constructed in the inner tube of the damping arrangement, so that both the upper and the lower piston surface of the damping piston are in contact with the damping fluid. With the oscillating movement of the damping piston, the damping fluid is therefore conveyed from the compression chamber into the return flow chamber, wherein as a function of the stroke movement of the damping piston the compression chamber and the return flow chamber interchange.

Such a system operating with parallel damping has the advantage that the damping fluid is constantly under pressure and in this way cavitation is prevented.

In a telescopic suspension fork leg used for the formation of the known front wheel fork, the piston rod extends through a cover of the damping arrangement into the latter, up to the piston, which is fastened to the piston rod. In the known front wheel fork, the air chamber with the main spring is located beneath the damping arrangement. In order to prevent oil from escaping from the damping arrangement in the direction of the air chamber, in the extended state, it is necessary to arrange a sealing arrangement in the region between the piston rod and the cover of the damping arrangement.

In the receiving space of the known front wheel fork, in which the main spring is located, both damping fluid, i.e. oil, and also air are present. On compression of the known front wheel fork, the pressure in the air chamber accommodating the main spring distinctly increases and, via the annular gap between the piston rod and the cover of the damping arrangement, a foamed oil-air mixture penetrates—and hence the effect occurs which is intended to be avoided by a double-acting damping, namely the formation of cavitation.

In addition, the penetration of oil from the air chamber into the damping arrangement leads to an increase of oil volume in the damping arrangement. The result is that the external reservoir, which is provided as an equalization arrangement, comes into solid compression with the piston provided therein for the pre-stressing of the oil volume in the damping arrangement; hence the response behaviour of the known front wheel fork deteriorates substantially, because it hardens and in adds to the risk of damage.

Known from US 2008/0230335 A1 is a front wheel fork which has a damping arrangement that is arranged beneath an upper oil chamber R1 and in which an opening is provided on the piston rod, via which, in the fully compressed state of the front wheel fork, oil can flow out from the damping arrangement under high pressure in the direction of a reservoir R3.

This known front wheel fork therefore has the disadvantage that a fluid flow from the damping arrangement in the direction of a reservoir only takes place in a highly stressed state of the damping arrangement, namely when the front wheel fork is almost completely compressed. Depending on the travel profile covered by the vehicle which is equipped with this known front wheel fork, this state may be rarely or never reached. Also, it is possible that depending on the setting of the response behaviour of the damping arrangement, the state of almost complete contraction of the known front wheel fork is likewise never reached. This leads to an effect with positive feedback, because the oil volume increases in the damping arrangement, the response behaviour of this known front wheel fork becomes noticeably harder for the rider and thereby uncomfortable. This usually leads to a rider then using the vehicle less dynamically, the compression movement of the known front wheel fork thereby decreases, and the damping arrangement fills further with oil and becomes still harder. Precisely the contrary undesired effect therefore is reached, namely a response behavior of the suspension fork which is no longer comparable with the response behaviour to which the rider is accustomed.

The rider of the vehicle is forced to bring about, for example, an emergency braking of the vehicle via the front wheel brake only, in order to achieve such a deep plunging of the front wheel fork that an oil volume equalization can be reached again via the known front wheel fork. It lies within the nature of the matter that this is counterproductive, and is not compatible with the aim of providing the rider of the vehicle with a vehicle having a spring damping behavior which is customary for him and his normal driving habits.

If this known front wheel fork is mounted on a bicycle which is also foreseen for travel over rough terrain, then such a front wheel fork must have large spring travels of up to 300 mm and more, which leads to the fact that an almost complete contraction of the suspension fork, continuing far beyond the normal compression movement, rarely takes place. Accordingly, with a design of the suspension fork according to this known suspension fork described above, a distinct change to the response behavior of the front wheel fork occurs, because it hardens with increasing operation of the vehicle which is equipped therewith—and hence confronts the rider with a response behavior which, for example during a competitive event, distinctly differs from the response behavior at the beginning of the event. This of course is undesirable. If an oil volume equalization then occurs, the response behavior of the known front wheel fork changes yet again, so that the rider is confronted with a non-constant response behavior of the front wheel fork.

By means of US 2010/0207350 A1 a telescopic suspension fork is known, which has a piston rod with a communication passage that allows for an exchange of fluid between the oil chamber in a damper cylinder and an oil chamber outside of the damper cylinder, when the telescopic suspension fork reaches a certain predetermined relieved position (which can be a maximally relieved position). According to one embodiment, the communication passage is a cross-section reduction of the piston rod provided with a constant diameter, as illustrated in FIG. 4 of the US 2010/0207350 A1 patent publication. The cross-section reduction possesses a sharp-edged transition to the non-tapered section. There is, therefore, a discontinuous jump between the tapered and the non-tapered sections. If a piston rod seal provided on the piston rod enters the tapered region due to a spring movement, a fluid exchange between the two oil chambers takes place. If the piston rod seal is located in the non-tapered region, it seals off the two oil chambers from each other. The movement of the piston rod seal across the region of the piston rod harbouring the discontinuous jump leads to a rapid wear of the elastomer piston rod seal. This formation of the cross-section reduction is supposed to serve a simpler manufacturing of the communication passage.

According to an alternative embodiment illustrated in FIG. 5 of US 2010/0207350, a fluid exchange between the oil chambers is possible via two radial communication bores provided in the piston rod. In both cases, the known telescopic suspension fork has a damper cylinder 21 located above, in the area of triple trees, which in a rebounded state of the spring is not located in the oil of the outer chamber, so that uncontrolled oil escape into the outer chamber occurs due to the opening function of the piston rod seal. However, out of the outer chamber air enters into the damper cylinder, which cannot escape to the top, but instead gathers beneath the floating piston. This means that the air cushion beneath the floating mount 61 grows over time and the damping function of the damper cylinder deteriorates.

From the foregoing background, the present invention addresses the problem of providing a telescopic suspension fork leg and a telescopic suspension fork equipped therewith, which reliably brings about an oil volume equalization between the damping arrangement and a reservoir or equalization chamber for damping fluid largely independently of the covered travel profile of the vehicle—and therefore also of possible downtime. A fork equipped therewith hence presents a response behavior which is largely independent of the travel profile.

To solve this problem known in the background art, with regard to the telescopic suspension fork leg, the present invention has fundamental features as indicated herein. Advantageous embodiments hereof are described in the further claims.

SUMMARY OF THE INVENTION

The invention provides a telescopic suspension fork leg with an inner tube and an outer tube and with a damping arrangement and a spring arrangement, which is arranged inside a first chamber formed in the outer tube, and is supported against a second chamber formed by the damping arrangement and arranged beneath the first chamber, which is constructed to receive a damping fluid. The damping arrangement has a piston, supported on a piston rod, with an upper and a lower piston surface, and the piston is displaceable within a damping tube which is arranged largely concentrically to the inner tube. The damping tube preferably is surrounded by an annulus chamber arranged largely concentrically to the damping tube, and a sealing arrangement, displaceable along the piston rod, preferably is provided between the first and second chamber. The piston rod preferably is provided with a fluid duct for fluidic communication of the first and second chambers, releasable with the sealing arrangement, in a state of the damping arrangement largely unstressed by the spring arrangement. The fluid duct preferably is provided with a transition surface in a transition region between a contact surface with the sealing arrangement, in which the fluidic communication is interrupted, and an adjacent surface, in which the fluidic communication is released, such that a contact surface formed along an inner perimeter line of the sealing arrangement and the transition surface varies on a relative movement between the sealing arrangement and the transition surface without a step function.

Consequently, during its movement along the transition surface, the damping arrangement does not encounter a jump-like or abrupt transition which could cause damage to the sealing arrangement.

The contact surface varies continuously in longitudinal direction of the piston rod, without having any abrupt transitions, as it is the case with some known telescopic suspension forks. This composition implies that the damping arrangement is not subject to premature wear, as it is the case with the known telescopic suspension fork, as its sealing lip is constantly moved over the rectangular step of the step jump and is subject to a rapid wear.

If in the telescopic suspension fork leg according to this disclosure, an entry of damping oil occurs from the first chamber, which has the spring arrangement, into the damping arrangement, then the arrangement according to this disclosure provides that through the fluidic communication between the first and second chamber, the damping fluid which has penetrated into the second chamber can flow back again into the first chamber with the spring arrangement. Hence a pumping-up of the damping arrangement, as is the case in known telescopic suspension fork legs, is avoided. Thereby, the effect of the hardening of the damping arrangement, which likewise constitutes a problem in the known telescopic suspension fork legs, also no longer occurs.

The telescopic suspension fork leg according to this disclosure is constructed so that the fluidic communication occurs in the largely unstressed state of the damping arrangement. This embodiment makes use of the new insight that the largely unstressed state of the damping arrangement occurs substantially more frequently in the normal driving mode or parking mode of a motorcycle or bicycle than in the completely deflected state.

If the telescopic suspension fork leg according to this disclosure, or respectively a telescopic suspension fork formed therewith, is mounted on a motorcycle which is provided for travel on paved roadways (for example a road motorcycle, a touring motorcycle or a sports motorcycle), then already a corresponding acceleration of the motorcycle with a largely extended telescopic suspension fork can provide that the largely unstressed state of the damping arrangement is reached, and then the fluid equalization between the first and second chamber occurs. If such a motorcycle is parked on a center stand, then also the largely unstressed state of the damping arrangement is reached and the fluid exchange again takes place.

If the telescopic suspension fork leg according to this disclosure, or respectively the telescopic suspension fork which is formed therewith, is installed on a motorcycle which is provided for travel on unpaved roadways (for example an off-road sports motorcycle), then the largely unstressed state of the damping arrangement also occurs there automatically when the motorcycle is parked on a center stand. This state can also be reached with a corresponding acceleration of the motorcycle and, for example, also when the off-road sports motorcycle has its front wheel in the air, which is frequently the case with such vehicles, namely for example on jumping over an uneven area of terrain. An embodiment of the telescopic suspension fork leg is disclosed such that the fluidic communication between the first and the second chamber takes place in a state of the damping arrangement which is largely unstressed by the spring arrangement, so a frequently occurring automatic adjusting of the telescopic suspension fork leg is achieved, i.e. a fluid exchange occurs from the second chamber in the direction of the first chamber, which in the unstressed state of the damping arrangement largely has ambient pressure. This provides that, even with a penetration of damping fluid from the first chamber into the second chamber, the damping arrangement is not accompanied by a change in the spring-damping behavior, because the penetrated damping fluid is regularly relieved again into the first chamber. As a beneficial result, the response behaviour of the damping arrangement of the telescopic suspension fork leg or respectively of the entire telescopic suspension fork always remains the same, and also does not change in an off-road sports motorcycle which is moved in a tough competitive activity.

The telescopic suspension fork leg according to this disclosure also has the advantage that the sealing arrangement which is arranged on the piston rod does not have to be applied with high prestressing thereon, because it does not have to completely prevent a penetration of damping fluid from the first chamber or respectively spring chamber into the damping arrangement. This is because a regular back-flow of the oil takes place, and therefore also a build-up of a high breakaway torque between the sealing arrangement and the piston rod does not occur; the telescopic suspension fork leg which is constructed therewith thus can be set so as to be reacting in a markedly sensitive manner.

It is provided for that the fluid duct can be actuated by means of the sealing arrangement for establishing and/or interrupting the fluidic communication. In other words, this means that the sealing arrangement provides that the fluid communication between the first chamber and the second chamber is established or interrupted, respectively, by the sealing arrangement. Hereby, it is achieved that depending on the purpose of use of the telescopic suspension fork leg (or respectively of the telescopic suspension fork which is equipped therewith), an interplay can be realized between the sealing arrangement and the fluid duct so that the fluidic communication can be adapted to the respective travel profile or to the respective purpose of use of the motorcycle or bicycle.

If, for example, an off-road sports motorcycle is concerned, then the sealing arrangement provides, in a largely completely extended state of the telescopic suspension fork leg, for the fluidic communication between the first and the second chamber; in a large and heavy touring motorcycle, which does not have a center stand, it is arranged so that the fluidic communication can take place on a normal acceleration process of the motorcycle.

According to a further refinement of the apparatus herein disclosed, provision is made that the fluid duct is a groove on the outer periphery of the piston rod, constructed along the longitudinal extent of the piston rod, in the longitudinal extent region of which groove the sealing arrangement enters on an extension movement of the telescopic suspension fork leg. Damping oil therefore can flow out from the damping arrangement into the spring chamber or first chamber. Several such grooves can also be arranged distributed on the peripheral circumference of the piston rod, which provide for a fluid exchange between the two chambers. Also, the groove formed on the piston rod has (or respectively the grooves have) a transition surface on both ends without any jumps, edges or steps or the like, such that the contact surface between the sealing arrangement and the transition surface in longitudinal direction of the piston rod varies continuously, and a rapid wear of the sealing arrangement is avoided.

The transition surface, in a horizontal projection view, may have a configuration running angularly from side lines of the groove, running in longitudinal direction of the piston rod, towards the ends of the end portions, and in an axial section view, an S-shape configuration curved from the surface of the piston rod to the bottom of the groove. The groove (or respectively the grooves) can be defined on a piston rod constructed of a drawn tube by means of a chipless deformation process. For this purpose a stamp with a positive form corresponding to the form and dimensions of the groove is brought into contact with the drawn tube under pressure, and the groove is produced by means of a plastic shaping process. After this shaping, the surface of the tube is grinded, so that no ridges, steps or jumps on the piston rod are formed as a consequence of the plastic shaping. Moreover, a finely finished surface of the piston rod develops due to the grinding process, along which the sealing arrangement can be displaced, without it being exposed to the risk of damage, as is the case with a known telescopic suspension fork leg.

If the sealing arrangement is located beneath the fluid duct, a fluid exchange cannot take place between the two chambers. If, however for example, a correspondingly intensive acceleration process takes place (or the sealing arrangement, for example on lifting the motorcycle on a center stand or after travelling over an area of unevenness on the roadway on extending, enters the region of the fluid duct), then damping fluid, which has penetrated therein, flows out of the second chamber, back to the first chamber and into the spring chamber via the fluid duct.

The telescopic suspension fork leg (or respectively the telescopic suspension fork) is adjusted again. According to a further feature of the apparatus, provision is also made that the fluid duct is a diameter reduction formed on the piston rod, which can be released by the sealing arrangement.

This means that in this embodiment the piston rod has a constriction which is formed above the sealing arrangement on the piston rod, and which is released by the sealing arrangement, when in an off-road sports motorcycle the front wheel is in the same moment located in the air and the telescopic suspension fork is extended, and in this way a fluid exchange takes place between the second and the first chambers.

According to a further development of the apparatus, provision is also made that this diameter reduction can be formed along a longitudinal extent of the piston rod, so that the constriction has a predetermined longitudinal extent. In this way it is possible that the sealing arrangement already enters the region of the diameter reduction in the case of a slight extension movement of the telescopic suspension fork, and this diameter reduction can be formed in the form of an encircling groove on the piston rod or, for example also just in the form of a segment of an encircling groove, so that the diameter reduction does not have to run completely around the piston rod.

Provision is made that the fluid duct is provided with a transition surface in a transition region between a contact surface with the sealing arrangement, in which the fluidic communication is interrupted, and an adjacent surface, in which the fluidic communication is freed, such that a contact surface formed along an inner periphery line of the sealing arrangement and the transition surface on a relative movement between the sealing arrangement and the transition surface ascends without a jump function. Thereby the sealing arrangement does not during its displacement encounter a jump-shaped or abrupt transition formed as a discontinuity, which could cause damage to the sealing arrangement.

According to an advantageous embodiment of the apparatus, therefore, a diameter reduction provided on the piston rod can be formed such that a radial transition takes place onto the cylindrical region of the piston rod, at which the fluidic communication between the first and second chamber is interrupted, adjoining which is a region which in a longitudinal sectional view of the piston rod forms a surface running at an angle of (for example) 8 degrees to 15 degrees to the longitudinal central axis of the piston rod, which in the lower transition region of the surface continues again radially into a region with reduced diameter of the piston rod, which has a predetermined longitudinal extent along the piston rod and in turn ascends into a radial transition region with a rising surface of again approximately 8 degrees to 15 degrees inclination adjoining thereto, which in turn follows radial transition surface and namely into the then adjoining region of the piston rod, in which a fluidic communication between the first and second chamber is interrupted again.

As mentioned above, the telescopic suspension fork leg according to this disclosure is distinguished, inter alia, in that the sealing arrangement, which is movable along the piston rod, does not have to be arranged with high prestressing on the piston rod. This is because a completely tight seat is not necessary, as a damping fluid which has penetrated into the second chamber is regularly relieved again into the first chamber. Nevertheless, it can, however, be advantageous if the sealing arrangement has an encircling sealing lip which is formed in the contact region with the arrangement with a coating to reduce the friction coefficient between the sealing lip and the arrangement. Thereby, a further reduction of the friction coefficient can be achieved, and a breakaway force of the sealing arrangement on the piston rod which already remains only scarcely present anyway, can be furthermore reduced.

According to a further development of the apparatus, the sealing arrangement is arranged under prestressing in an annular space within a cover closing off the second chamber with respect to the chamber, and the cover is provided on an outer peripheral region with at least one sealing lip, which rests against an inner peripheral wall of the inner tube. The cover lies securely relative to the inner tube (or respectively to the inner peripheral wall of the inner tube) and with its sealing lip arranged on the outer periphery provides that damping fluid cannot flow out from the damping arrangement into the spring chamber (or vice versa); this seal seat is also maintained, even with varying pressure levels in the spring chamber or respectively in the damping arrangement.

In the telescopic suspension fork according to this disclosure, the damping arrangement is located inside an oil volume in the second chamber, so that the sealing arrangement is located in lubricating oil inside the outer chamber—and therefore cannot suck in air from the surrounding volume, and the damping behavior of the damping arrangement cannot change due to air inlet. Changing damping behaviour is the case with a device with a damping arrangement located in the upper region of the telescopic suspension fork, as known from US 2010/0207350 A1.

Any air which has entered the damping arrangement by virtue of a foaming of the oil-air mixture in the spring chamber is reliably discharged out of the damping arrangement via the fluid duct and a seal seat between the sealing arrangement and the piston rod, because the sealing arrangement is the highest located component of the damping arrangement.

Finally, the disclosed apparatus also provides a telescopic suspension fork which has two telescopic suspension fork legs as have been explained above, and for example can also have an upper fork bridge and a lower fork bridge. The telescopic suspension fork legs are arranged here on the telescopic suspension fork such that the damping arrangement is arranged respectively beneath the first chamber receiving the spring arrangement. In the first chamber receiving the spring arrangement, damping fluid is present also, for lubrication, but air is also present in the first chamber. During the operation of the telescopic suspension fork, the oil-air mixture in the spring chamber is placed under high pressure when the telescopic suspension fork is (for example) almost completely compressed; and if in such a state a penetration of air should occur into the damping arrangement via the sealing arrangement on the piston rod, then the telescopic suspension fork according to the disclosure provides that during the fluidic communication which is brought about between the first and the second chambers, this air escapes again in the direction of the first chamber. This escape is because the first chamber is arranged above the damping arrangement, and thus even a penetration of air into the damping arrangement does not lead to a permanent change in the response behavior of the damping arrangement, and hence of the telescopic suspension fork.

The invention is explained in further detail below with the aid of the drawings.

BRIEF DESCRIPTION OF THE DRAWINGS

The invention will now be described with reference to the drawing wherein:

FIG. 5 is a horizontal projection view of a piston rod with a fluid duct constructed as a groove;

FIG. 6 is a sectional view, rotated by 90 degrees, of the piston rod according to FIG. 5;

FIG. 7 is an enlarged illustration of the cut-out "A" according to FIG. 6; and

DESCRIPTION OF PREFERRED EMBODIMENTS

Figure 1:
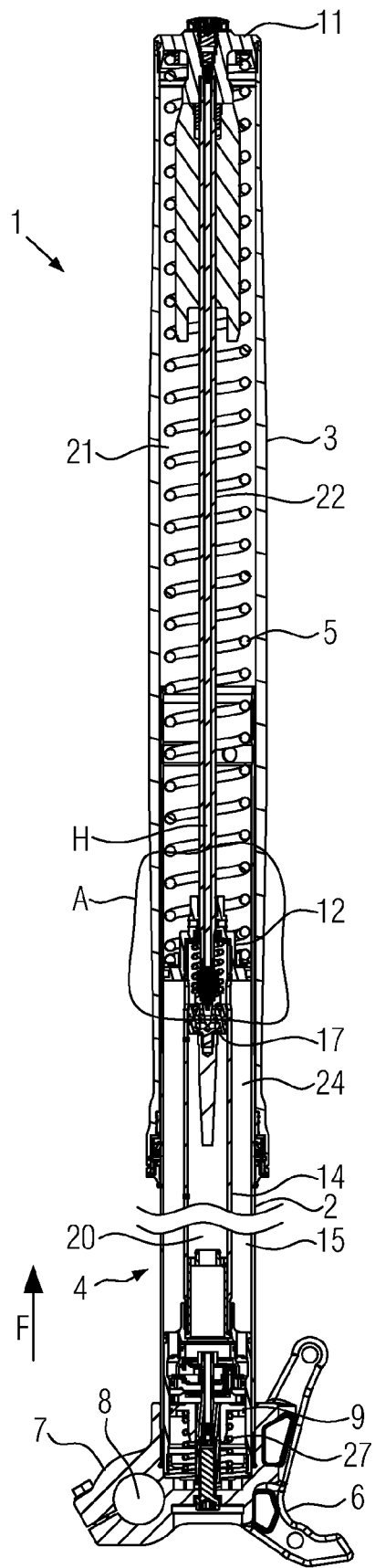
FIG. 1 is a longitudinal sectional view of a telescopic suspension fork leg in accordance with an embodiment according to the present invention.
Figure 8:
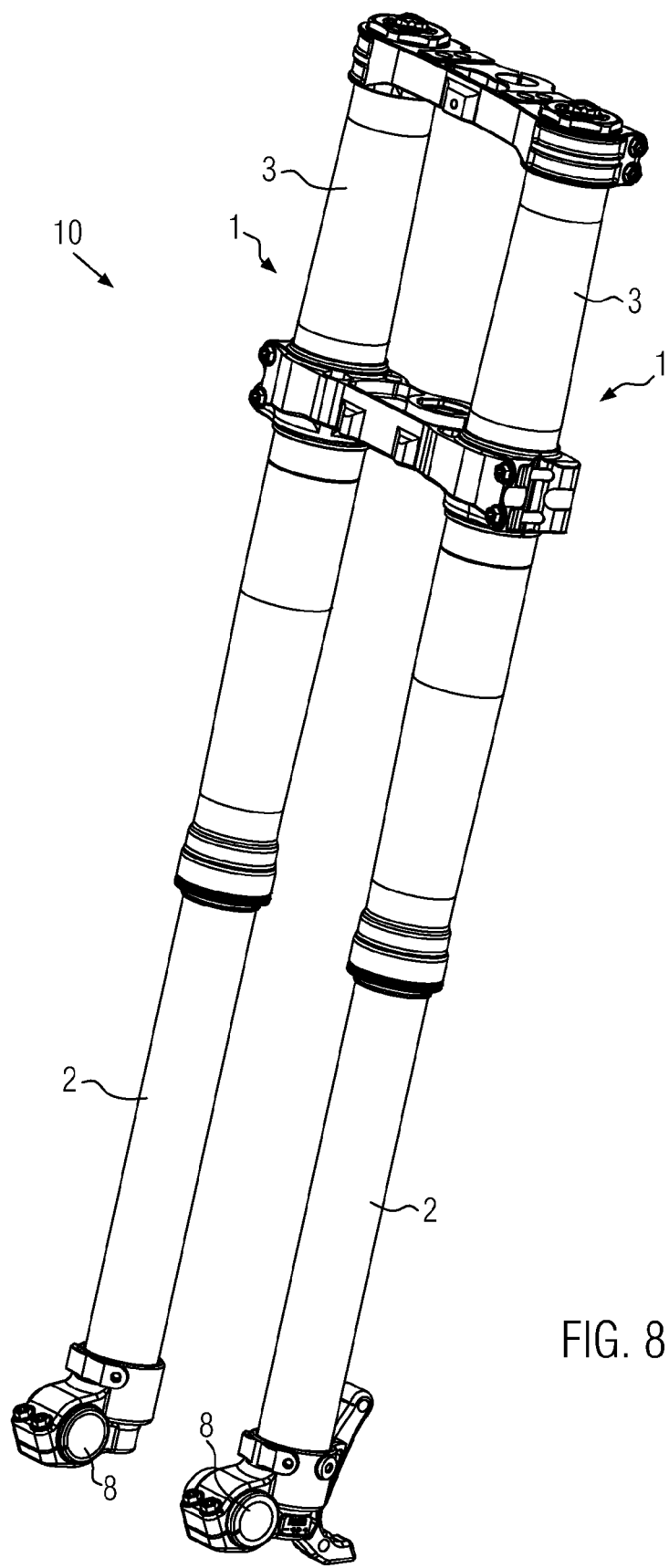
FIG. 8 is a perspective view of a telescopic suspension fork with two telescopic suspension fork legs according to the present invention.

Attention is invited to FIG. 1 of the drawings, showing a longitudinal sectional illustration of an embodiment of a single telescopic suspension fork leg 1 in accordance with the present invention. Two such suspension fork legs 1, 1 as configured for use are seen in FIG. 8

The telescopic suspension fork leg 1 has an inner tube 2, an outer tube 3, a damping arrangement 4 and a spring arrangement 5 in the form, for example, of a main spring. A half axle, not illustrated in further detail, of a front wheel of a motor cycle can be fastened by means of the gripping clamp 7 on an axle clamp 6, wherein for this purpose a bore 8 is provided for mounting the half axle.

In the region of the end section of the inner tube 2 facing the axle clamp 6, a valve body 9 is provided which is provided to bring about the damping effect and the adjusting of the damping characteristic of the apparatus. These may be adjusted to the response behavior of the telescopic suspension fork leg 1 as desired by the rider, and hence of the overall telescopic suspension fork 10 which can be seen in further detail with the aid of FIG. 8.

At the end of the telescopic suspension fork leg 1 lying opposite of the valve body 9, a closure cover 11 is provided which can be screwed into the outer tube 3 and which serves at the same time for supporting the main spring 5. At its end lying opposite the closure cover 11, the main spring rests on a cover 12 and more specifically with the interposition of an annular disc 13 which can be seen in further detail with the aid of FIG. 2.

The damping arrangement 4 has a damping tube 14, arranged concentrically to the inner tube 2. The damping tube 14 is surrounded by an annulus chamber 15, which forms the region between the outer periphery surface area of the damping tube 14 and the inner periphery surface area of the inner tube 2.

If, in the installed state, the telescopic suspension fork leg 1 is acted upon by a force, originating for example from an unevenness in the ground over which the associated vehicle passes, acting in the direction of the arrow F (FIG. 1), then this causes a telescope-like movement of the inner tube 2 relative to the outer tube 3, i.e. the inner tube 2 is displaced in an upward direction in the plane of the drawing; this displacement occurs contrary to the action of the main spring 5. The main spring 5 is thereby compressed and the damping piston 16, which is depicted in further detail in FIGS. 2 and 3, thereby moves relative to the damping tube 14. The damping piston 16 displaces, by its lower piston surface 17, the damping fluid which is present inside the interior of the damping tube 14.

Figure 2:
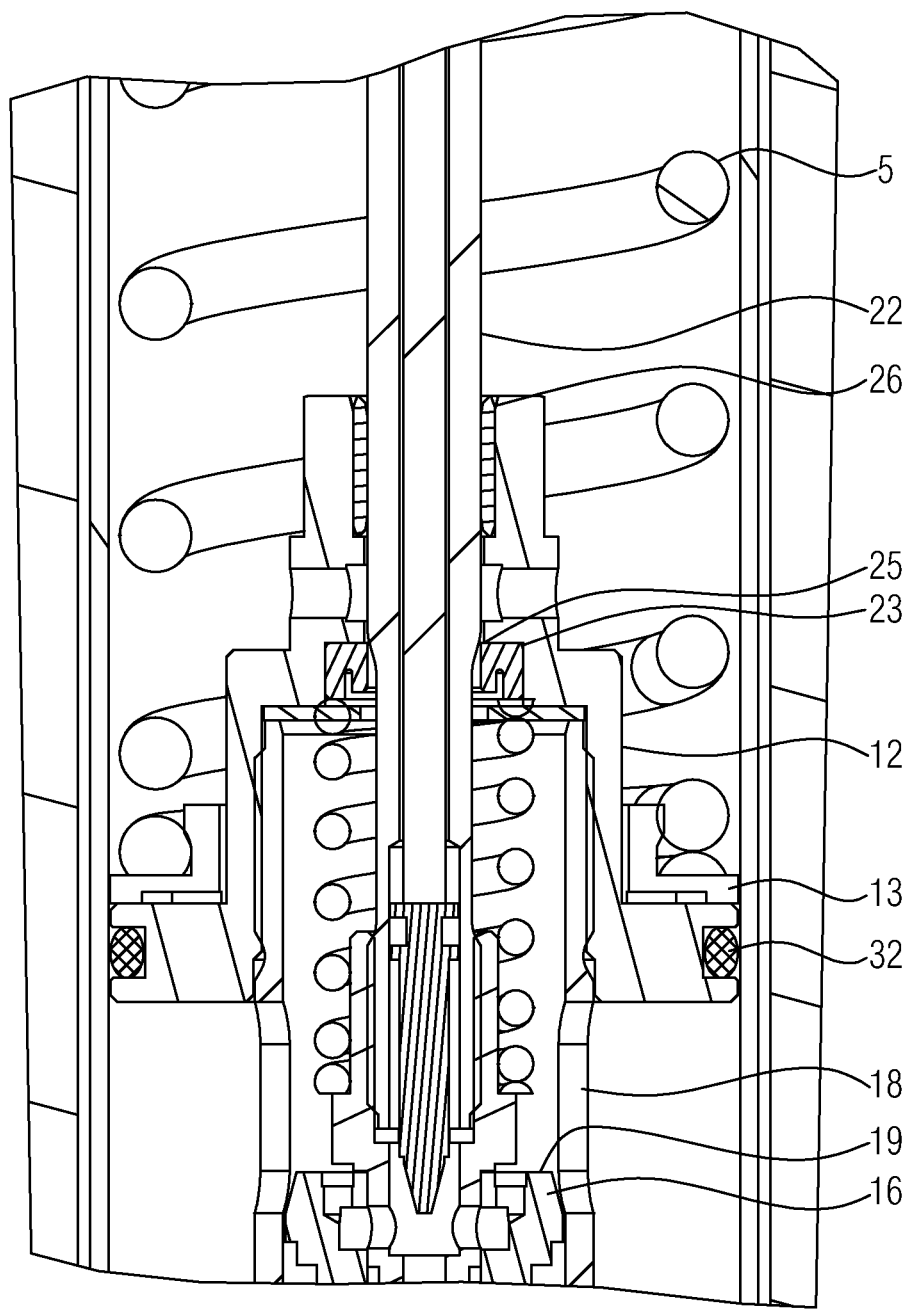
FIG. 2 is an enlarged view of the detail "A" according to FIG. 1 of the drawings.

The damping fluid which is thus displaced arrives via bores formed in the valve body 9 into the annulus chamber 15, flows there in the plane of the drawing in an upward direction and enters again into the interior 20 of the damping tube 14 via the opening 18 which can be seen in FIG. 2, and acts upon the upper piston surface 19 of the damping piston 16.

The main spring 5 is arranged inside a first chamber or spring chamber 21, defined within the outer tube 3, which is partially filled with damping fluid, and in which also a volume of air is provided with an appropriate installation position on the motorcycle somewhere above the cover 12. The damping piston 16 is secured on a piston rod 22 extending within the interior of the outer tube 3, which piston rod can be fastened to the closure cover 11, and serves for supporting the damping piston 16 with respect to the internal pressure which is built up in the interior 20. On the piston rod 22, a sealing arrangement 23 is provided (which can be seen with the aid of FIGS. 2 and 3), and which serves for sealing the first chamber 21 with respect to the second chamber 24 within the damping arrangement 4.

The pressure in the second chamber 24 changes as a function of, inter alia, the relative displacement of the inner tube 2 and outer tube 3 with respect to each other, and also as a function of the setting of the bores (or alternatively valves) which are provided on the valve body 9. If within a relative movement of the inner tube 2 and outer tube 3 with respect to each other the build-up of a pressure occurs in the first chamber 21, then damping fluid (in the form of a fork oil) can pass through in the direction of the second chamber 24 via a sealing gap formed between the sealing arrangement 23 and the outer periphery surface area of the piston rod 22. A completely hermetic sealing of the sealing arrangement 23 relative to the piston rod 22, however, is not necessary, as will be further explained below.

The seat of the sealing arrangement 23 on the piston rod 22 is selected so that in fact no great volumes of oil pass through, but no great surface pressure occurs between a sealing lip 25 of the sealing arrangement 23 and the piston rod 22. The piston rod 22 is guided via a guide bush 26, which is provided on an end region, in the shape of a pipe connection, of the cover 12, as seen in FIG. 2.

FIG. 1 of the drawings shows the telescopic suspension fork leg 1 in an extended state, which corresponds to a state in which the damping arrangement 4 is largely unstressed by the action of the spring arrangement 5. If a motorcycle which is provided with the telescopic suspension fork 10 is used appropriately, then the forces occurring on the front wheel (which wheel is not illustrated in further detail), lead during travel to a stressing of the telescopic suspension fork leg in the direction of the force F according to FIG. 1—i.e. the inner tube 2 is moved relative to the outer tube 3 in an upward direction in the plane of the drawing. In such a state, the sealing arrangement 23 is situated for example at the height of the reference label H illustrated in FIG. 1. This reference label or line cannot be seen in FIG. 2 of the drawings, because it is situated above the portion "cutout A" according to FIG. 1 of the drawings, which is illustrated in FIG. 2. However, it thereby becomes clear that the sealing arrangement 23 is situated arranged in the cylindrical region of the piston rod 22, and therefore the sealing surface of the sealing arrangement 23 (or respectively the sealing lip 25 of the sealing arrangement 23) lies against the outer periphery surface of the piston rod 22; this arrangement largely prevents an passage of damping fluid from the first chamber 21 into the second chamber 24.

Owing to unavoidable leakages in the system during the operation of the motorcycle and the high pressure occurring in the first chamber 21, a slow flowing of damping fluid out from the first chamber 21 occurs into the second chamber 24, i.e. an increase of damping fluid in the damping arrangement 4.

Referring again to FIG. 1, the damping arrangement has a cartridge spring 27 which is provided in the region of the end of the inner tube 2 on the axle clamp side, and which equalizes a defined increase of damping fluid in the damping arrangement 4 in that it is compressed. The receiving capacity of additional damping fluid in the damping arrangement 4 is, however, limited and a further rise of the oil volume in the damping arrangement 4 would lead to the cartridge spring 27 coming into solid compression, as is the case in known telescopic suspension forks.

However, the configuration according to the present apparatus avoids this problem in that a fluidic communication occurs between the first chamber 21 and the second chamber 24, when the damping arrangement 4 is largely not stressed by the spring arrangement 5. In such a state, the telescopic suspension fork leg 1 is situated in a largely extended state; for example, when the front wheel of an off-road sports motorcycle (which is provided with the configuration according to this disclosure) is at a moment situated in the air, or the motorcycle has been parked on the center stand and the telescopic suspension fork leg (or respectively the overall telescopic suspension fork) assumes the position illustrated in FIG. 1 of the drawings. This extended position also corresponds to the configurations as illustrated in FIG. 2 and FIG. 3 of the drawings.

Figure 3:
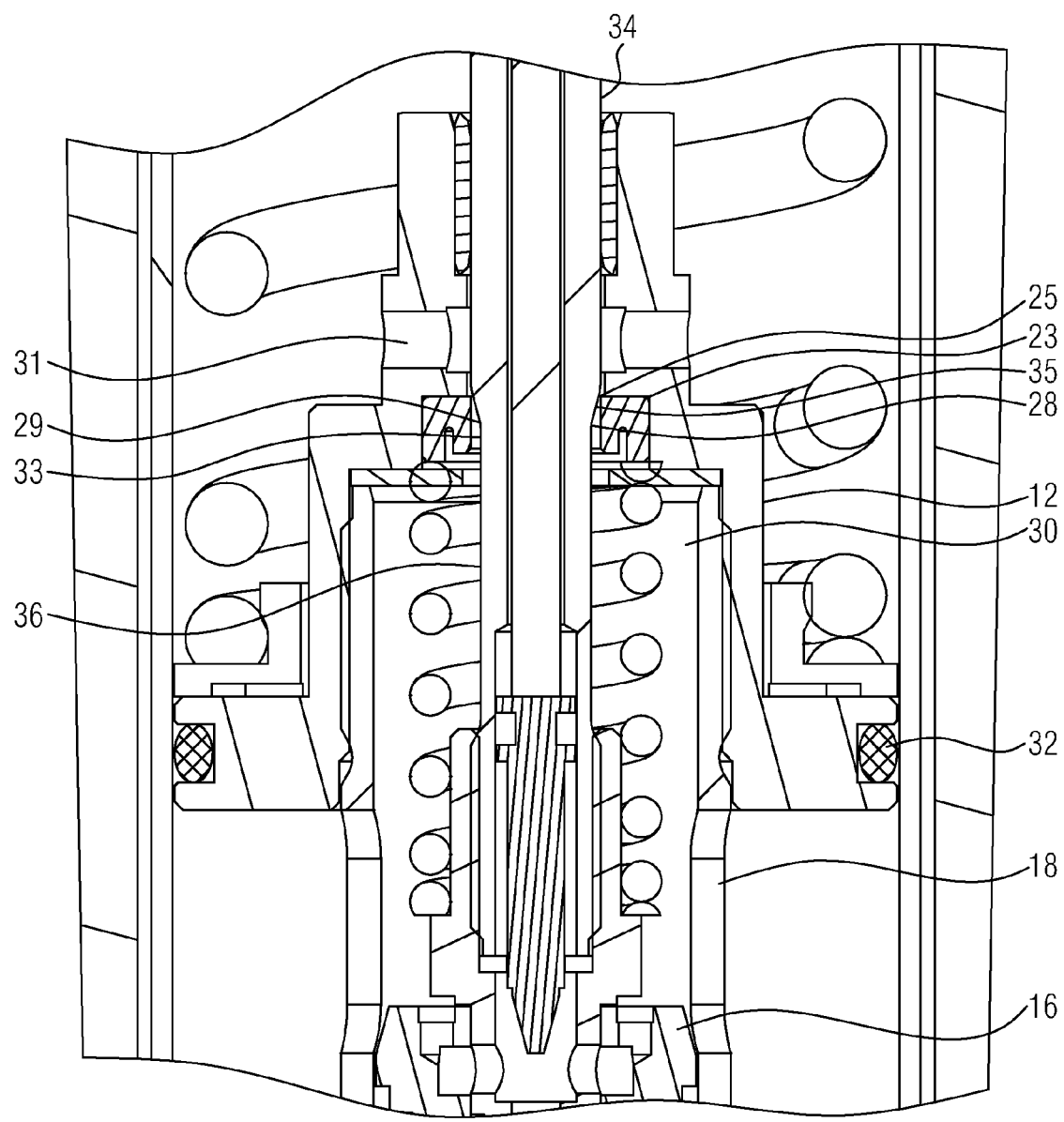
FIG. 3 is a still further enlarged illustration of the cut-out "A" seen in FIG. 2.

As can be readily seen with the aid of FIG. 3 of the drawings, in this "extended" state the sealing arrangement 23 is situated in the transition region 28 of a diameter reduction 29, or alternatively is already arranged inside the diameter reduction 29. In such a position of the damping arrangement 4, which is largely unstressed by the spring arrangement 5, the sealing arrangement 23 no longer seals with respect to the piston rod 22 and a fluidic communication occurs between the first chamber 21 and the second chamber 24.

In this state of the damping arrangement 4, which is largely unstressed by the spring arrangement 5, the pressure level in the first chamber 21 is largely at ambient pressure and is less than the pressure level in the damping arrangement 4 or respectively in the second chamber 24.

In this manner, excess damping fluid which has arrived into the damping arrangement 4 can flow back into the first chamber 21 via the fluidic communication between the second chamber 24 and the first chamber 21, and an adjustment of the damping arrangement 4 takes place. Excess damping fluid which has accumulated in the second chamber 24 flows via the opening 18 and an interior 30 of the cover 12, the diameter reduction 29 and a transverse bore 31 (FIG. 3), back into the first chamber (spring chamber 21) again, and the pressure level in the damping arrangement 4 assumes again the pressure level specified by its design; thus, the damping arrangement 4 is adjusted again and a rider of the motorcycle is not confronted with a response behavior of the damping arrangement 4 which changes dependent on the stress. This, in turn, leads to the fact that the response behavior of the telescopic suspension fork 10, which uses the telescopic suspension fork legs 1 according to this disclosure, does not change during the appropriate operation, and the telescopic suspension fork 10 presents to the rider a beneficially consistent response behavior.

The telescopic suspension fork leg 1 according to the invention, and the telescopic suspension fork 10 which is equipped therewith, present the advantage that the damping arrangement is adjusted before the stroke and this process is repeated very regularly. The configuration furthermore presents the advantage that the breakaway torque of the sealing arrangement sliding on the piston rod is markedly small and therefore the behavior of the configuration due to friction is improved. Through the cross-section narrowing presented in the illustrated embodiment, a smooth sliding up of the sealing arrangement occurs into the region of the piston rod 22, at which the sealing arrangement 23 is to produce a sealing effect, for which reason the seal has a high degree of durability and furthermore a reliable opening function is guaranteed.

If during the relative movement of the sealing arrangement 23 relative to the piston rod 22 the sealing arrangement 23 is situated in the region of a contact surface 34 (illustrated in FIG. 3), that is, in the cylindrical region of the piston rod 22, then the fluidic communication between the first chamber 21 and the second chamber 24 is interrupted there (with the exception of unavoidable leakages), by a resting of the sealing arrangement 23 with its sealing lip 25 against the contact surface 34. If for example due to a rebound movement of the telescopic suspension fork 10 the sealing arrangement 23 enters the region of a lower surface 36, in which the fluidic communication between the two chambers 21, 24 is released, then the sealing lip 25 of the sealing arrangement 23 moves along an S-form shaped transition surface 33 (FIG. 3) on its way between the contact surface 34 and the surface 36, along which in longitudinal direction of the piston rod 22 a fluid flow gradually develops between the two chambers 21, 24.

The transition surface 33 is designed smoothly and without jump-like or abrupt or sharp step-like changes of the surface shape. Along the inner perimeter line of the sealing lip 25 of the sealing arrangement 23 and the transition surface 23, a contact surface 35 is hence formed, along which the sealing lip 25 moves. The contact surface 35 possesses no abrupt jump- or step-like changes with respect to its slope in longitudinal direction of the piston rod 22. The contact surface 35 thus runs continuously, the transition surface 33 is designed without discontinuity loci corresponding to a step function, so it runs smoothly and without disadvantageous step-like changes.

Figure 4:
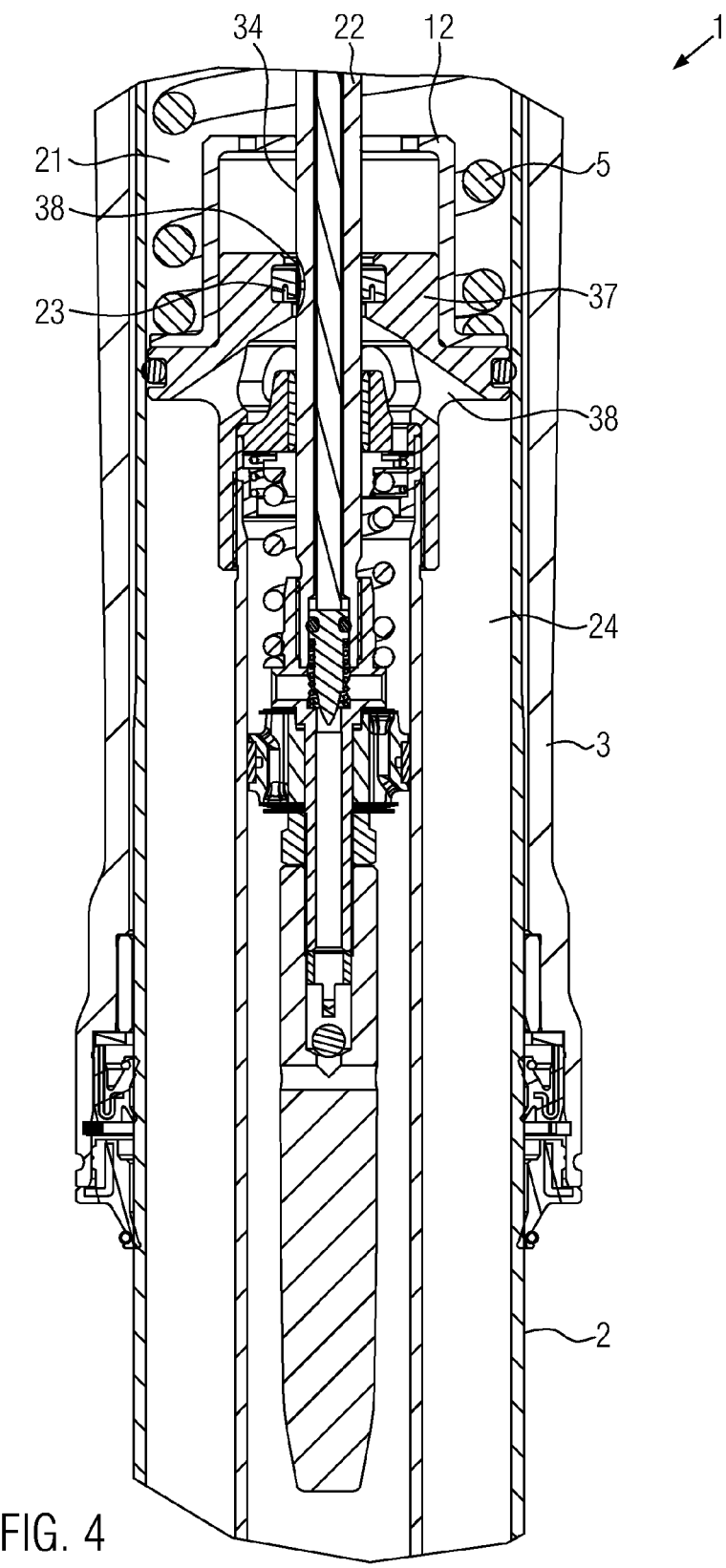
FIG. 4 is a longitudinal sectional view of a telescopic suspension fork leg in accordance with a further embodiment according to the present invention.

FIG. 4 of the drawings illustrates a cut-out of an alternative embodiment of a telescopic suspension fork leg 1 according to the invention. It has an inner tube 1, an outer tube 3, a piston rod 22, a main spring 5, a cover 12 as well as a sealing arrangement 23 arranged in a container 37. In the position illustrated in FIG. 4, the sealing arrangement 23 is located in a region of a fluid channel designed as a groove 38. This means, in other words, that a fluidic communication between the first chamber 21 and the second chamber 24 can take place via the groove 38.

If the sealing arrangement 23 with its sealing lip 25 is located in a region of a contact surface 34, then the sealing lip 25 seals the first chamber 21 off from the second chamber 24. However, if the sealing arrangement 23 enters the region of the groove 38, lubricating oil can flow back into the first chamber 21 out of the second chamber 24 via a bore 38 formed in the container 37.

FIG. 5 of the drawings illustrates a cut-out of the piston rod 22 with a groove 38 formed at the outer periphery surface of the piston rod 22. In the illustrated embodiment the groove 38 has a length of, for example, about 9 mm in axial longitudinal direction of the piston rod 22, a width transverse to the longitudinal direction of about 1 mm, and a depth of about 0.6 mm (which is more apparent from FIG. 7 of the drawings).

FIG. 6 illustrates a longitudinal sectional illustration of a part of a piston rod 22 with a cut-out "A" which is illustrated in more detail in FIG. 7 of the drawings. The piston rod 22 has a contact surface 34, upon which the sealing arrangement 23 with its sealing lip 25 rests, in order to largely prevent the outflow of lubricating oil from the first chamber into the second chamber 24. In the region of the surface 36 a fluidic communication between the two chambers 21, 24 is released and a transition region 28 is located in-between, containing the transition surface 33. Similar to the embodiment illustrated in FIG. 3, the groove 38 also has an s-shaped configuration with smooth transitions without a step-jump, jumps or steps or the like in the transition region 28 between the contact surface 35 and the surface 36. If the sealing arrangement 23 moves from the region of the contact surface 35 into the region of the piston rod 23, which contains the groove 38, then the sealing lip 25 slides over the region of the transition surface 33 with the contact surface 35, along which the sealing effect of the sealing lip 25 gradually decreases. The contact surface 35 is free of sharp corners, edges, steps, jumps or the like and therefore does not damage the sealing lip 25 on its sliding travel from the contact surface 34 to the region of the groove 38, in which the sealing lip 25 does no longer extend to the bottom of the groove 39.

The groove 38 is introduced into the piston rod 22 by means of a shaping tool without cutting, if during the chipless production step the piston rod 22 takes on a slightly oval shape deviating from a round shape, this does not pose a problem, because such a small ovality can be compensated for again during a subsequent grinding process, during which the surface of the piston rod 22 is finely ground.

With regard to features of the invention which are not explained in further detail above, reference is to be made in addition expressly to the claims and the drawings.

LIST OF REFERENCE NUMBERS 1 telescopic suspension fork leg
2 inner tube
3 outer tube
4 damping arrangement
5 spring arrangement, main spring
6 axle clamp 36 surface
7 gripping clamp
8 bore
9 valve body
10 telescopic suspension fork
11 closure cover
12 cover
13 annular disc
14 damping tube
15 annular space chamber
16 damping piston, piston
17 lower piston surface
18 opening
19 upper piston surface
20 interior space
21 first chamber, spring chamber
22 piston rod
23 sealing arrangement
24 second chamber
25 sealing lip
26 guide bush
27 cartridge spring
28 transition region
29 diameter reduction
30 interior
31 transverse bore
32 seal
33 transition surface
34 contact surface
35 contact surface
36 surface
37 container
38 groove
39 bottom of the groove Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A telescopic suspension fork leg comprising:
an inner tube and an outer tube;
a damping arrangement;
a spring arrangement arranged inside a first chamber defined in the outer tube and supported against a second chamber formed by the damping arrangement and arranged beneath the first chamber which is constructed to receive a damping fluid;
wherein the damping arrangement has a piston, supported on a piston rod with an upper and a lower piston surface, and the piston being displaceable within a damping tube arranged largely concentrically to the inner tube, and the damping tube is surrounded by an annulus chamber arranged largely concentrically to the damping tube;
a sealing arrangement, displaceable along the piston rod, provided between the first and the second chambers;
wherein the piston rod is provided with a fluid duct for fluidic communication of the first and second chambers, releasable with the sealing arrangement in a state of the damping arrangement substantially unstressed by the spring arrangement;
wherein the fluid duct is provided with a transition surface in a transition region between a contact surface with the sealing arrangement, in which the fluidic communication is interrupted, and an adjacent surface, in which the fluidic communication is released, such that a contact surface formed along an inner perimeter line of the sealing arrangement and the transition surface varies on a relative movement between the sealing arrangement and the transition surface without a jump function.

2. The telescopic suspension fork leg according to claim 1 wherein the fluid duct is formed such that the fluidic communication is brought about in a largely extended state of the telescopic suspension fork leg.

3. The telescopic suspension fork leg according to claim 1, wherein the fluid duct is a diameter reduction formed on the piston rod, which is releasable by the sealing arrangement.

4. The telescopic suspension fork leg according to claim 1, wherein the fluid duct is a groove extending in a longitudinal direction of the piston rod along a surface of the piston rod, which has a transition surface in end portions of the groove.

5. The telescopic suspension fork leg according to claim 4, wherein the transition surface, in a horizontal projection view, has a configuration running angularly from side lines of the groove, running in the longitudinal direction of the piston rod, towards ends of the end portions, and in an axial section view, an S-shape configuration curved from the surface of the piston rod to the bottom of the groove.

6. The telescopic suspension fork leg according to claim 1, wherein the sealing arrangement has an encircling sealing lip which is provided, in the contact region with the fluid duct, with a coating to reduce a friction coefficient between the sealing lip and the fluid duct.

7. The telescopic suspension fork leg according to claim 1, wherein the sealing arrangement is arranged under prestressing in an annular space within a cover closing off the second chamber with respect to the first chamber, and the cover is provided on an outer perimeter region with at least one seal which lies against an inner perimeter wall of the inner tube.

8. The telescopic suspension fork leg according to claim 1, wherein the damping arrangement is located inside an oil volume in the second chamber, such that the sealing arrangement is in the oil volume.

9. The telescopic suspension fork leg according to claim 1, wherein the sealing arrangement is on the piston rod such that the sealing arrangement is the highest located component of the damping arrangement.

10. A telescopic suspension fork comprising two telescopic suspension fork legs according to claim 1, wherein the telescopic suspension fork legs are arranged such that the damping arrangement is disposed beneath the first chamber which receives the spring arrangement.

* * * * *